United States Patent [19]

Schmidt

[11] Patent Number: 4,616,672

[45] Date of Patent: Oct. 14, 1986

[54] PRESSURE RELIEF AND DRAIN VALVE

[75] Inventor: Michael R. Schmidt, Carmel, Ind.

[73] Assignee: General Motors Corporation, Detroit, Mich.

[21] Appl. No.: 822,653

[22] Filed: Jan. 27, 1986

[51] Int. Cl.⁴ .............................................. F16K 17/34
[52] U.S. Cl. .................................. 137/107; 137/115; 137/484.2; 137/484.6
[58] Field of Search ..................... 137/107, 115, 484.2, 137/484.4, 484.6

[56] References Cited

U.S. PATENT DOCUMENTS 1,994,320  3/1935  McLaughlin ............. 137/484.26 X
2,859,762 11/1958  Banker ........................... 137/115 X

FOREIGN PATENT DOCUMENTS 1808882  6/1970  Fed. Rep. of Germany ...... 137/107

Primary Examiner—Harold W. Weakley
Attorney, Agent, or Firm—Saul Schwartz

[57] ABSTRACT

A pressure relief and drain valve includes a poppet valve on a valve body movable in a primary valve chamber between closed and open positions and spring biased to the closed position. A secondary valve slidable on the poppet valve cooperates therewith and with the valve body in defining a variable volume secondary chamber within the primary chamber. Passages in the poppet valve connect the fluid circuit upstream of the poppet valve with the secondary chamber and drain orifices in the poppet valve connect the secondary chamber with a sump. When the net fluid pressure force on the poppet valve in the opening direction exceeds the spring force, the poppet valve opens for pressure relief. The fluid flows over a suction surface on the poppet valve when the latter is open and the pressure drop at the suction surface proportional to the flow velocity is communicated by the passages to the secondary chamber so that the valve opens further and the pressure drop across the valve is substantially constant. When the fluid circuit is unpressurized the secondary valve opens the drain orifices so that the circuit drains through the passages, the secondary chamber and the orifices.

3 Claims, 1 Drawing Figure

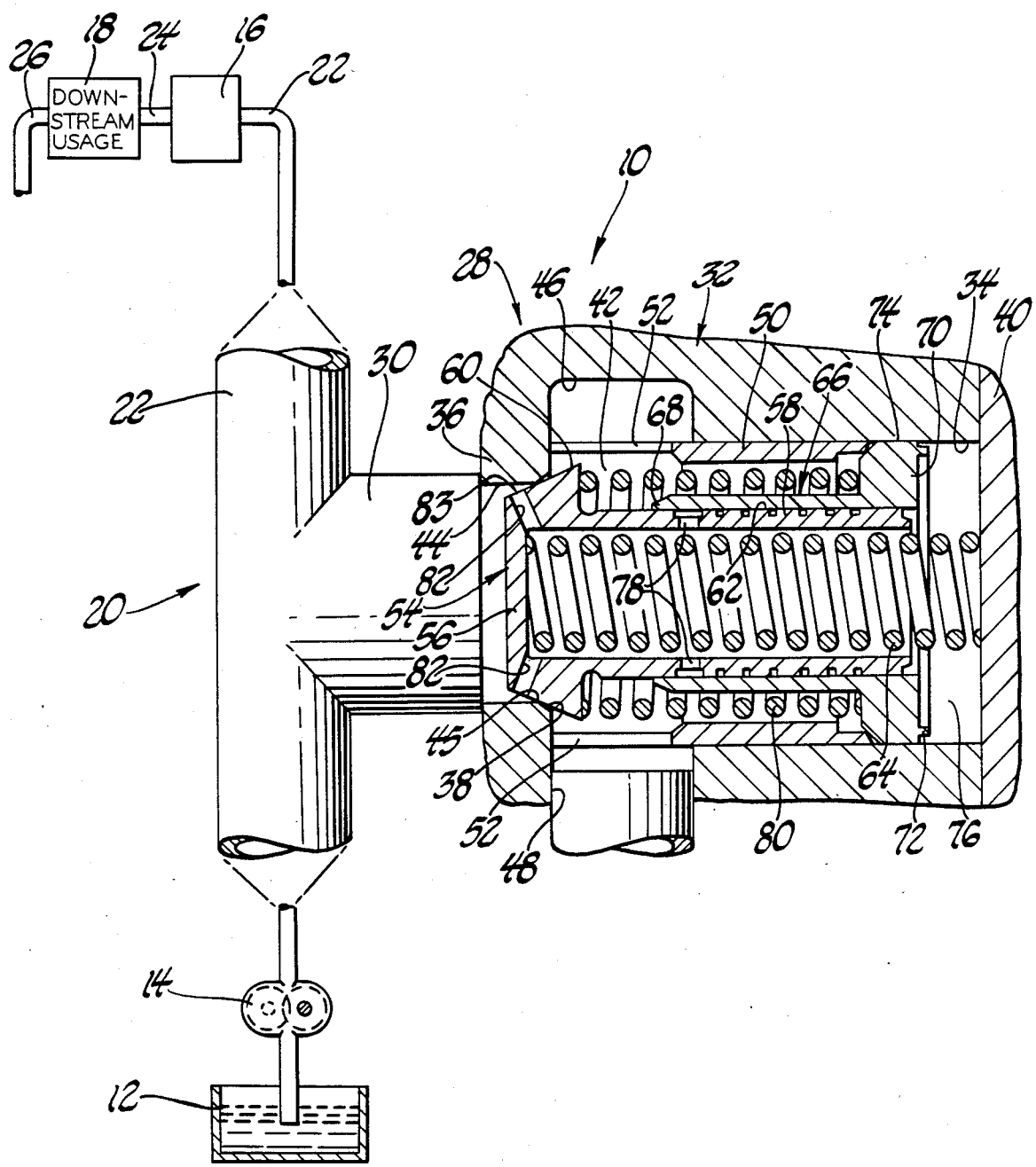

PRESSURE RELIEF AND DRAIN VALVE

The invention herein described was made in the course of work under a contract or subcontract thereunder with the Department of Defense.

BACKGROUND OF THE INVENTION

1. Field of the Invention

This invention relates generally to fluid pressure relief valves and, more particularly, to a relief valve wherein the pressure drop across the valve is substantially constant and the fluid circuit with which the valve is associated drains through the valve when the circuit is unpressurized.

2. Description of the Prior Art

Relief valves are used in fluid pressure circuits to establish maximum circuit pressure. In typical simple relief valves where a valve element is spring biased to a closed position and forced open by fluid pressure above a maximum value, flow through the valve varies directly with the pressure gradient across the valve. In order to increase the rate at which fluid exhausts, the pressure gradient across the valve must increase. In addition, where the fluid circuit is a transmission hydraulic control circuit including a filter chamber which does not drain when the circuit is unpressurized, the task of changing the filter is rendered more difficult by the residual fluid in the chamber. A relief valve according to this invention, once open, responds to increased flow rate to decrease the resistance to additional valve element movement so that the pressure gradient across the valve is substantially constant and, in the closed position, provides a convenient circuit drain when the circuit is unpressurized.

SUMMARY OF THE INVENTION

Accordingly, the primary feature of this invention is that it provides a new and improved fluid pressure relief and drain valve of the type having a valve element spring biased to a closed position and urged to an open position by pressure in the fluid circuit. Another feature of this invention resides in the provision in the new and improved valve of means defining a secondary chamber behind the valve element having the fluid circuit pressure therein, the pressure in the secondary chamber urging the valve element in the closing direction so that the valve element opens when only a net pressure force on the valve element in the valve opening direction exceeds the biasing spring force in the valve closing direction. Still another feature of this invention resides in the provision in the new and improved valve of means for decreasing the fluid pressure in the secondary chamber in response to an increase in the fluid flow rate through the valve so that the valve element opens further to maintain a substantially constant pressure gradient across the valve. Still another feature of this invention resides in the provision in the new and improved valve of a suction surface on the valve element over which fluid flows when the valve is open and in the provision of a passage in the valve element from the suction surface to the secondary chamber, the pressure decrease at the suction surface due to an increase in fluid velocity over the suction surface being communicated by the passage to the secondary chamber so that the net pressure force on the valve element in the valve opening direction increases and the valve element opens further. Another feature of this invention resides in the provision in the new and improved valve of means responsive to pressure in the fluid circuit to open a drain connection when the circuit is unpressurized. Still further specific features of this invention reside in the provision in the new and improved valve of a secondary valve element on the primary valve element responsive to pressure in the fluid circuit to open a drain orifice when the circuit is unpressurized and to close the drain orifice when any significant pressure exists in the circuit.

These and other features of this invention will be readily apparent from the following specification and from the single drawing FIGURE depicting a preferred embodiment of the relief and drain valve according to this invention.

Referring now to the single drawing FIGURE, a schematically illustrated hydraulic system 10, which may for example be the hydraulic control for an automatic transmission for a track laying vehicle, includes a fluid sump 12, a pump 14, a filter housing 16 and a downstream usage 18. A fluid circuit 20 from the pump 14 to the downstream usage 18 is defined by a conduit 22 between the pump and the filter housing 16 and by a conduit 24 from the filter housing to the downstream usage. All fluid flowing in the conduit 22 passes through a filter element, not shown, in the housing 16 before passing to the downstream usage through conduit 24. Typically, the downstream usage exhausts to the sump through a conduit 26. A pressure relief and drain valve 28 according to this invention is connected to the fluid circuit 20 by a branch 30 of conduit 22 and operates to limit the pressure in the fluid circuit when the latter is pressurized by pump 14 and to provide a convenient drain to the sump 12 when the circuit is unpressurized.

The valve 28 includes a partially illustrated valve body 32 having a cylindrical bore 34 therein, the left-hand end of which has an inturned flange 36 of reduced diameter therearound. One edge of the flange 36 is beveled to define a frustoconical outer valve seat 38. The right-hand end of the bore 34 is open for assembly purposes and thereafter is sealingly closed by a schematically illustrated end cap 40. When the end cap is in place, the bore 34 defines a primary valve chamber 42. The circular edge defined at the junction of outer valve seat 38 and an internal cylindrical surface 44 of the flange 36 defines an inlet port 45 to the primary valve chamber 42. An undercut groove 46 in the valve body 32 circumscribes the bore 34 and is connected to the sump 12 by a schematically illustrated passage 48. A sleeve 50 seats against the inturned flange 36 within the bore 34 and has a plurality of holes aligned with the groove 46 which holes define a plurality of exhaust ports 52 from the primary chamber 42.

A primary valve element in the form of a poppet valve 54 is disposed in the primary valve chamber 42 between the inturned flange 36 and the end cap 40. The poppet valve 54 includes a solid head portion 56 and a hollow, tubular stem portion 58 integral with the head portion. The head portion 56 has an external frustoconical surface therearound defining an inner valve seat 60 adapted for sealing engagement on the outer valve seat 38 on the flange 36. The cylindrical wall of the stem portion 58 has an outer cylindrical surface 62 and is open at the right-hand end of the poppet valve. A first spring 64 in the stem portion seats at one end against the head portion 56 of the poppet valve and at the other end against the end cap 40 and functions to resiliently bias the poppet valve in a valve closing direction to a closed position, shown in the drawing, wherein the inner valve seat 60 seats against the outer valve seat 38 thereby to close the inlet port 45 to the primary valve chamber 42.

A sleeve-like secondary valve 66 in the primary valve chamber 42 includes a tubular body 68 and an integral annular flange 70 with a circular lip 72 thereon. The tubular body 68 is slidably received on the outer cylindrical surface 62 of the stem portion 58 while an outer surface 74 of the annular flange 70 slidably and sealingly engages the cylindrical bore 34. The flange 70 of the secondary valve 66 cooperates with the hollow stem portion of the poppet valve 54 and the end cap 40 and the bore 34 in defining a variable volume secondary chamber 76. The portion of the poppet valve 54 defining the secondary chamber 76 represents a secondary area of the poppet valve exposed to fluid pressure in the secondary chamber.

A plurality of drain orifices 78 are formed in the cylindrical wall of the stem portion 58 of the poppet valve and provide communication between the secondary chamber 76 and the exhaust ports 52. A second spring 80 disposed between the head portion 56 of the poppet valve and the annular flange 70 of the secondary valve biases the latter to the right to a draining position, not shown, wherein the lip 72 on the annular flange 70 abuts the end cap 40 and the tubular body exposes the orifices 78. Fluid pressure in the secondary chamber 76 urges the secondary valve 66 to a non-draining position, shown in the drawing FIGURE, wherein the tubular body 68 sealingly covers the drain orifices 78. A plurality of passages 82 extend from an upstream suction surface portion 83 of the inner valve seat 60 to the base of the hollow stem portion 58 of the poppet valve. In the closed position of the poppet valve, the upstream suction surface portion 83 and the ends of the passages 82 are located upstream of the inlet port 45 and are part of a primary surface area of the poppet valve exposed to fluid pressure in the fluid circuit 20.

Describing, now, the operation of the valve 28 and commencing with the pump 14 off and the fluid circuit 20 drained, the first spring 64 biases the poppet valve 54 to the closed position thereof and the second spring 80 biases the secondary valve 66 to the draining position thereof. When the pump 14 starts, fluid drawn from the sump 12 fills the fluid circuit 20 and pressurizes the same as flow restrictions in the downstream usage prevent unobstructed fluid flow back to the sump 12. Shortly, fluid pressure in the circuit 20 stabilizes at a working pressure below the maximum pressure for the circuit. The working pressure reacts against the primary surface area of the poppet valve in a valve opening direction. Simultaneously, the fluid fills and pressurizes the secondary chamber 76 because the inflow through the passages 82 exceeds outflow through the orifices 78. The working pressure in the secondary chamber reacts against the secondary area of the poppet valve in the valve closing direction, thereby assisting the spring 64 in maintaining the poppet valve in the closed position, and against the annular flange 70 of the secondary valve. The net fluid pressure force in the valve opening direction is proportional to the difference between the primary and secondary surface areas of the poppet valve. The primary and secondary surface areas are proportioned such that when normal working pressure exists in the fluid circuit 20, the net fluid pressure force in the valve opening direction is insufficient to overcome the force of spring 64 in the valve closing direction so that the poppet valve maintains the closed position. With respect to the secondary valve 66, working pressure in the secondary chamber 76 reacting against annular flange 70 of the secondary valve exerts a pressure force thereon to the left. The pressure force on the secondary valve quickly overcomes the relatively weak second spring 80 and shifts the secondary valve 66 along the stem portion 58 of the poppet valve to the non-draining position covering the orifices 78 and severing the flow paths between the secondary chamber 76 and the exhaust ports 52.

If an extraordinary flow restriction occurs in the hydraulic circuit 20, the fluid pressure in the circuit rapidly increases thereby causing a simultaneous increase in the net pressure force on the poppet valve 54 in the valve opening direction. When the net valve opening pressure force exceeds, primarily, the force exerted by the spring 64, the poppet valve 54 strokes to the right from the closed position to an open position, not shown, wherein an annular flow orifice is created between the inner and outer valve seats 60 and 38, respectively. Consequently, fluid flows from the hydraulic circuit 20, through the inlet port 45, and then to the sump 12 through the exhaust ports 52 to relieve the pressure in the circuit 20.

As the inner and outer valve seats separate, fluid begins streaming over the suction surface portion 83 and the upstream ends of the passages 82. As the flow rate increases from zero, pressure at the suction surface ends of the passages 82 decreases from the pressure level prevailing in the fluid circuit at the instant the valve opens. Simultaneously, the pressure in secondary chamber 76 decreases by the same amount so that the net pressure force on the poppet valve in the valve opening direction increases and the depth of the annular orifice between the valve seats increases to exhaust still more fluid from the circuit 20. When the increase in net pressure force on the poppet valve in the opening direction just equals the increase in force in the valve closing direction exerted by springs 64 and 80, the poppet valve stabilizes in the open position.

If, once the poppet valve achieves the open position, still more backpressure inducing flow restrictions develop in the fluid circuit 20, the flow rate through the annular orifice and across the suction surface defined by inner valve seat 60 begins to increase. Simultaneously, the pressure at the suction surface ends of the passages 82 and in the secondary chamber 76 decreases so that the net fluid pressure force on the poppet valve in the valve opening direction increases. As a result, the depth of the annular flow orifice increases to permit additional fluid outflow without significant increase in the pressure gradient across the annular orifice. When the obstruction in the fluid circuit 20 is cleared, the fluid pressure in the circuit decreases to the normal working level allowing the springs 64 and 80 to project the poppet valve 54 to the closed position terminating fluid flow from the circuit 20 to the sump.

When the pump 14 is turned off, the fluid pressure in the circuit 20 decreases from the working pressure level to a much lower level at or approaching atmospheric pressure. Simultaneously, pressure in secondary chamber 76 likewise decreases because of the communication provided by the passages 82. As the fluid pressure in secondary chamber 76 decreases, spring 80 projects the secondary valve 66 to the right to the draining position wherein the lip 72 engages the end cap 40 and the drain orifices 78 are exposed. Thus, fluid in the filter housing 16, which may be located at an elevation above the valve 28, is allowed to drain to the sump 12 through the valve 28 thereby facilitating removal and replacement of the filter element by preventing substantial fluid leakage when the housing is unsealed.

The embodiments of the invention in which an exclusive property or privilege is claimed are defined as follows:

1. A pressure relief and drain valve for a fluid circuit having a pressurized fluid selectively circulated therein comprising:

a valve body connected to said circuit and to a sump, a valve element on said valve body moveable between an open position and a closed position wherein a primary surface area of said valve element is exposed to fluid pressure in said circuit and blocks fluid flow from said circuit to said sump, said fluid pressure in said circuit exerting a force on said primary surface area in the valve opening direction, spring means biasing said valve element toward said closed position, valve seat means on said valve element and said valve body operative to define an annular orifice in said valve element open position through which said fluid flows from said circuit to said sump to relieve circuit pressure, means on said valve element and on said valve body defining a variable volume secondary chamber, said valve element having a secondary surface area exposed to said secondary chamber, means on said valve element primary surface area defining a suction surface over which said fluid flows in said valve element open position, means on said valve element defining a passage between said suction surface and said secondary chamber whereby said fluid pressure in said circuit exists in said secondary chamber in said valve element closed position so that the net fluid pressure force on said valve element in the valve opening direction is proportional to the difference between said primary and said secondary surface areas, the flow of fluid over said suction surface in said valve element open position effecting a decrease in pressure in said secondary chamber proportional to the velocity over said suction surface so that the net fluid pressure force on said valve element in the valve opening direction and the depth of said annular orifice increase when the fluid flow velocity increases, and means on said valve body and said valve element responsive to the pressure of said fluid in said circuit in said valve element closed position to open said secondary chamber to said sump when said fluid circuit is substantially depressurized so that said fluid circuit drains to said sump when said circuit is depressurized.

2. A pressure relief and drain valve for a fluid circuit having a pressurized fluid selectively circulated therein comprising:

a valve body having a primary chamber with an inlet port connected to said circuit and an exhaust port connected to a sump, means on said valve body defining an outer valve seat downstream of said inlet port, a poppet valve having a head portion with a frustoconical inner valve seat thereon and a tubular stem portion, means mounting said poppet valve on said valve body for movement in said primary chamber between an open position and a closed position wherein a primary surface area of said head portion including an upstream suction surface portion of said inner valve seat is exposed to fluid pressure in circuit and blocks fluid flow from said inlet port to said exhaust port, said fluid pressure in said circuit exerting a force on said primary surface area in the valve opening direction and said inner and said outer valve seats cooperating in said poppet valve open position to define an annular orifice through which said fluid flows from said inlet port to said exhaust port for pressure relief, said fluid flowing over said suction surface in said poppet valve open position, spring means biasing said poppet valve toward said closed position, means between said poppet valve stem portion and said primary chamber defining a variable volume secondary chamber, said poppet valve having a secondary surface area exposed to said secondary chamber, means on said poppet valve defining a passage between said upstream suction surface portion and said secondary chamber whereby said fluid pressure in said circuit exists in said secondary chamber in said poppet valve closed position so that the net fluid pressure force on said poppet valve in the valve opening direction is proportional to the difference between said primary and said secondary surface areas, the flow of fluid over said suction surface portion in said poppet valve open position effecting a decrease in pressure in said secondary chamber proportional to the velocity over said suction surface portion so that the net fluid pressure force on said poppet valve in the valve opening direction and the depth of said annular orifice increase when the fluid flow velocity increases, and means on said valve body and said poppet valve operative in said poppet valve closed position to open said secondary chamber to said exhaust port when said fluid circuit is substantially depressurized so that said fluid circuit drains through said exhaust port when said circuit is depressurized.

3. A pressure relief and drain valve for a fluid circuit having a pressurized fluid selectively circulated therein comprising:

a valve body having a cylindrical primary valve chamber with a closed end and an inlet port at an open end connected to said circuit and an exhaust port connected to a sump, means on said valve body defining an outer valve seat downstream of said inlet port, a poppet valve having a solid head portion with an external frustoconical surface defining an inner valve seat and a hollow tubular stem portion with an open end, a secondary valve slidably disposed on said stem portion for movement relative thereto between a draining position and a non-draining position, means slidably mounting said secondary valve in said primary valve chamber so that said poppet valve is mounted in said primary valve chamber for movement between an open position and a closed position wherein a primary surface area of said head portion including an upstream suction surface portion of said inner valve seat is exposed to said fluid pressure in said circuit and blocks fluid flow from said inlet port to said exhaust port, said secondary valve cooperating with said poppet valve and said primary valve chamber closed end in defining a variable volume secondary chamber, said poppet valve having a secondary surface area exposed to said secondary chamber, said fluid pressure in said circuit exerting a force on said primary surface area in the valve opening direction and said inner and said outer valve seats cooperating in said poppet valve open position to define an annular orifice through which said fluid flows from said inlet port to said exhaust port for pressure relief, said fluid flowing over said suction surface portion in said poppet valve open position, first spring means between said poppet valve and said valve body biasing said poppet valve to said closed position, second spring means between said poppet valve and said secondary valve biasing said secondary valve toward said draining position, means on said poppet valve defining a passage between said suction surface portion and said secondary chamber whereby said fluid pressure in said circuit exists in said secondary chamber in said poppet valve closed position and the net fluid pressure force on said poppet valve in the valve opening direction is proportional to the difference between said primary and said secondary surface areas, the flow of fluid over said suction surface portion in said poppet valve open position effecting a decrease in pressure in said secondary chamber proportional to the velocity over said suction surface portion so that the net fluid pressure force on said poppet valve in the valve opening direction and the depth of said annular orifice increase when said fluid flow velocity increases, and means on said poppet valve defining an orifice in said stem portion providing communication between said secondary chamber and said exhaust port, fluid pressure in said secondary chamber moving said secondary valve to said non-draining position wherein said secondary valve closes said stem portion orifice and said second spring means moving said secondary valve to said draining position opening said stem portion orifice when said circuit is depressurized so that said circuit drains through said exhaust port when said circuit is depressurized.

* * * * *